US010773990B2

(12) United States Patent
Jewell et al.

(10) Patent No.: US 10,773,990 B2
(45) Date of Patent: Sep. 15, 2020

(54) PURGE DEVICE FOR AN OPTICAL FIBER DRAW SYSTEM (71) Applicant: Corning Incorporated, Corning, NY (US)

(72) Inventors: John Michael Jewell, Wilmington, NC (US); Nikolaos Pantelis Kladias, Horseheads, NY (US); Robert Walter Nason, Wilmington, NC (US); Bruce Warren Reding, Wilmington, NC (US); Edward Barry Richter, Wilmington, NC (US); Daniel Paul Veber, Wilmington, NC (US); Chunfeng Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 232 days.

(21) Appl. No.: 15/787,956

(22) Filed: Oct. 19, 2017

(65) Prior Publication Data
US 2018/0111871 A1    Apr. 26, 2018

Related U.S. Application Data (60) Provisional application No. 62/411,084, filed on Oct. 21, 2016.

(51) Int. Cl.
C03B 37/029 (2006.01)
C03B 37/027 (2006.01)
C03B 37/025 (2006.01)

(52) U.S. Cl.
CPC .......... *C03B 37/029* (2013.01); *C03B 37/025* (2013.01); *C03B 37/02718* (2013.01); *C03B 2205/91* (2013.01); *Y02P 40/57* (2015.11)

(58) Field of Classification Search
CPC .......... C03B 37/01257; C03B 37/0124; C03B 37/025; C03B 37/0253; C03B 37/02; C03B 37/029
See application file for complete search history.

(56) References Cited

U.S. PATENT DOCUMENTS

| 4,030,901 | A  | 6/1977  | Kaiser |
| 5,974,838 | A  | 11/1999 | Uhm et al. |
| 6,345,519 | B1 | 2/2002  | Dickinson, Jr. et al. |
| 6,381,990 | B1 | 5/2002  | Ball et al. |
| 6,658,897 | B2 | 12/2003 | Berndt et al. |
| 2004/0050094 | A1 | 3/2004 | Thonnelier et al. |

(Continued)

FOREIGN PATENT DOCUMENTS

| JP | 2011236071 A | 11/2011 |
| JP | 2012082089 A * | 4/2012 ........... C03B 37/029 |

OTHER PUBLICATIONS

International Search Report and Written Opinion PCT/US2017/057526 dated Jan. 30, 2018.

*Primary Examiner* — Cynthia Szewczyk
(74) *Attorney, Agent, or Firm* — Robert L. Carlson (57) ABSTRACT An optical fiber production system is provided which includes a slow-cooling device and a purge device positioned above the slow-cooling device. The purge device includes a tube defining an inlet. An optical fiber extends through the slow-cooling device and the purge device. The purge device is configured to inject a purge gas through the inlet and against the optical fiber.

17 Claims, 7 Drawing Sheets (56) References Cited

U.S. PATENT DOCUMENTS

2007/0022786 A1\* 2/2007 Foster ............... C03B 37/02718
65/384
2007/0169516 A1\* 7/2007 Guskov ............. C03B 37/01426
65/531

\* cited by examiner

FIG. 6

US 10,773,990 B2

PURGE DEVICE FOR AN OPTICAL FIBER DRAW SYSTEM

This application claims the benefit of priority under 35 U.S.C. § 119 of U.S. Provisional Application Ser. No. 62/411,084 filed on Oct. 21, 2016 the content of which is relied upon and incorporated herein by reference in its entirety.

FIELD OF THE DISCLOSURE

The present disclosure generally relates to a fiber draw system, and more specifically, to a system for reducing optical fiber breaks in the fiber draw system.

BACKGROUND

Graphite is widely used in fiber draw furnaces due to its high operational temperature. In the hot zone of the furnace, reactions with the furnace wall cause erosion and formation of saturated SiC and SiO vapor. This saturated vapor is cooled as it moves lower in the furnace and away from the hot zone which results in deposition of SiC on the furnace wall. In addition SiO precipitates out and forms SiO particles. These particles typically agglomerate into larger particles which may eventually break loose from the draw furnace wall, get reintroduced into the gas stream and contact the fiber. Large graphite and SiO particles can cause fiber breaks when they adhere to the fiber and create flaws on its surface. Smaller graphite particulate that becomes incorporated into the fiber during the draw process may cause unacceptable product losses due to draw-induced point defects.

In addition to causing defects in the draw furnace, particulate can be transported out of the draw furnace and into a slow-cooling device due to momentum diffusion from the fiber motion. Due to the small diameter of the slow-cooling treatment device (SCD), these particles are in close proximity to the fiber and may cause additional point defects and fiber breaks as the fiber is still hot and therefore vulnerable to damage. In addition, equipment and process changes may contribute to increased number of particulates that flow into the SCD and increase the potential of breaks.

SUMMARY OF THE DISCLOSURE

According to at least one aspect of the present disclosure, an optical fiber production system includes a slow-cooling device and a purge device positioned above the slow-cooling device. The purge device includes a tube defining an inlet. An optical fiber extends through the slow-cooling device and the purge device. The purge device is configured to inject a purge gas through the inlet and against the optical fiber.

According to another aspect of the present disclosure, an optical fiber production system includes a slow-cooling device. A purge device is positioned above the slow-cooling device and includes a tube defining a passageway through which an optical fiber is drawn and an inlet. The purge device is configured to inject a purge gas into the passageway through the inlet and against the optical fiber such that the purge gas disrupts a boundary layer of gas present along the optical fiber.

According to another aspect of the present disclosure, a method of forming an optical fiber includes the steps of: providing a tube and a nozzle assembly positioned over a slow-cooling treatment device, the tube defining an inlet; heating an optical fiber preform; drawing an optical fiber from the preform; passing the optical fiber through the tube and the nozzle assembly; and injecting a purge gas through the inlet toward the optical fiber.

These and other features, advantages, and objects of the present disclosure will be further understood and appreciated by those skilled in the art by reference to the following specification, claims, and appended drawings.

DETAILED DESCRIPTION

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Figure 1:
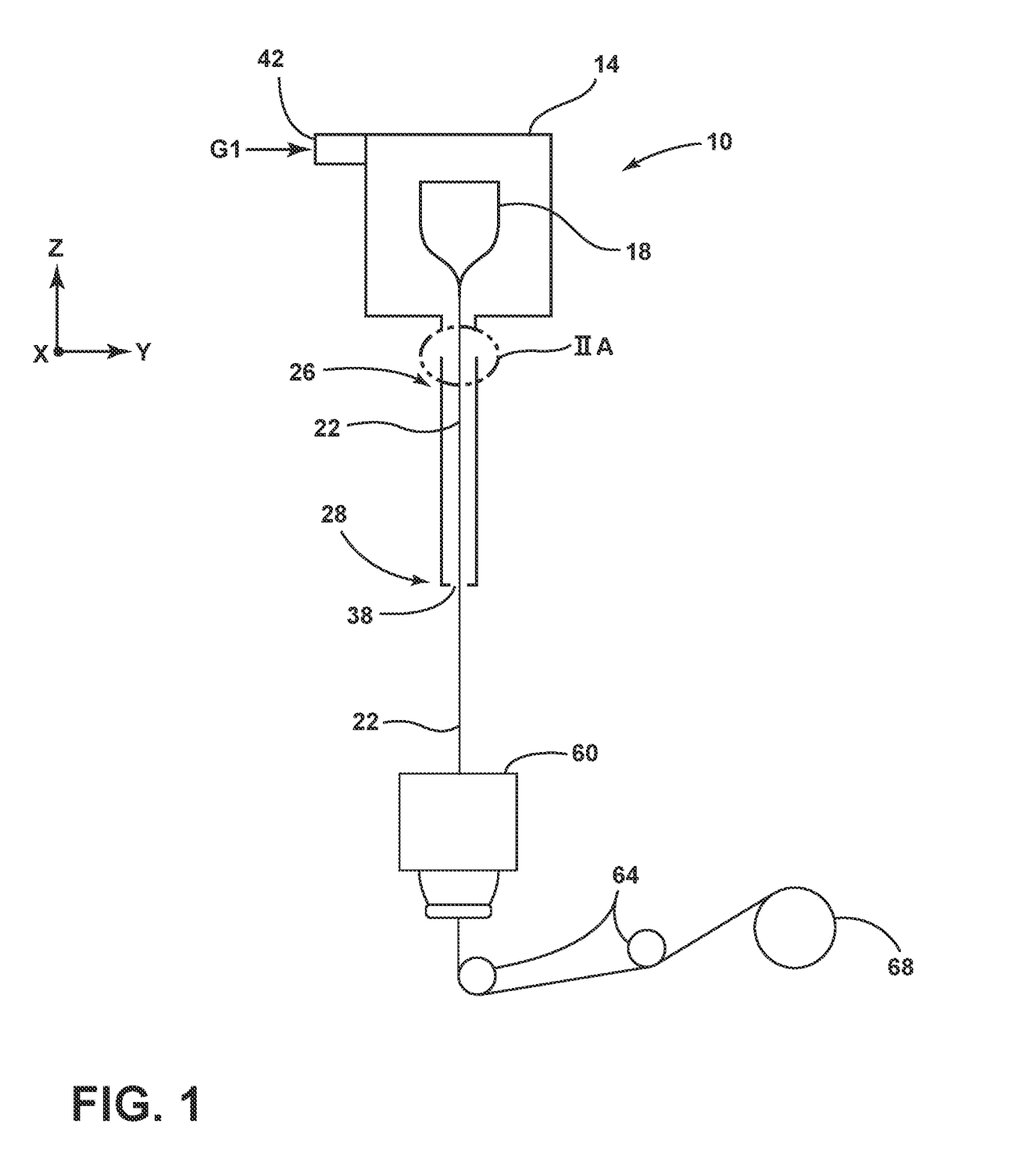
FIG. 1 is a schematic diagram illustrating an optical fiber production system having a slow-cooling device, according to one embodiment.

Referring to FIG. 1, an optical fiber production system 10 is schematically shown, according to one embodiment. The system 10 includes a furnace 14 that may be heated to a temperature of about 2,000° C. A glass optical fiber preform 18 is placed in the furnace 14 and fiber is drawn therefrom to create a bare optical fiber 22. The preform 18 may be constructed of any glass or material and may be doped suitable for the manufacture of optical fibers. Once the bare optical fiber 22 is drawn from the preform 18, the bare optical fiber 22 may be cooled in a slow-cooling treatment device 26 ("SCD") shown and described herein as a treatment tube according to one embodiment. The slow-cooling tube or treatment device 26 is shown distanced from the exit of the furnace 14, according to one embodiment. However, it should be appreciated that treatment device 26 could otherwise be coupled to the furnace 14 or otherwise connected thereto according to other embodiments.

Figure 2A:
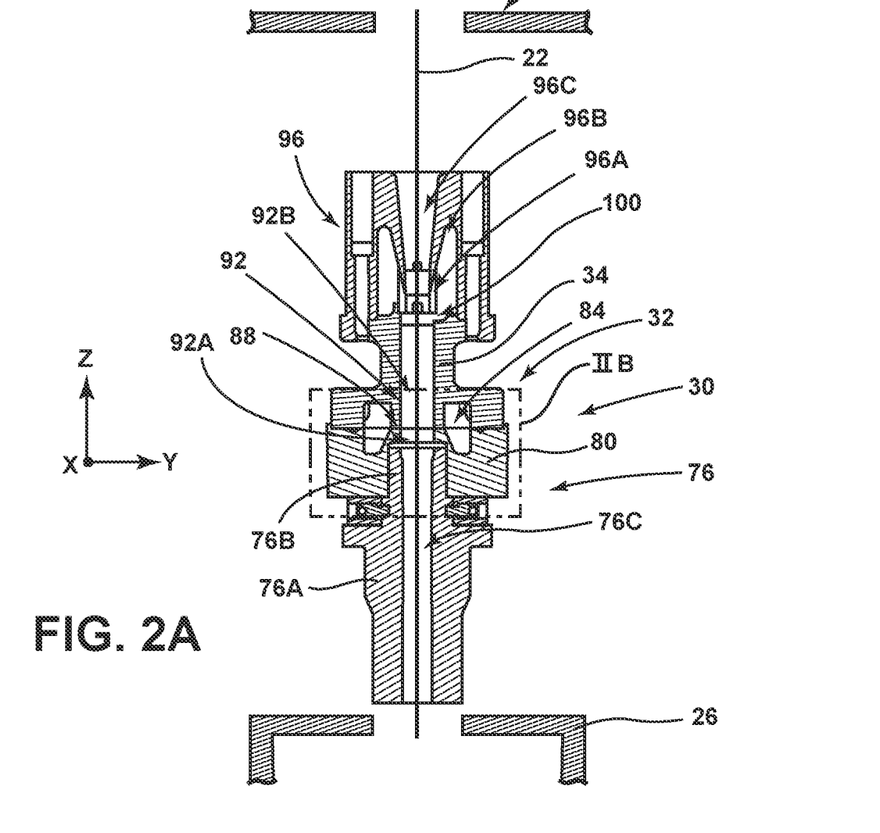
FIG. 2A is an enhanced cross-sectional view of a top region of the slow-cooling device taken at section IIA of FIG. 1, according to one embodiment.
Figure 2B:
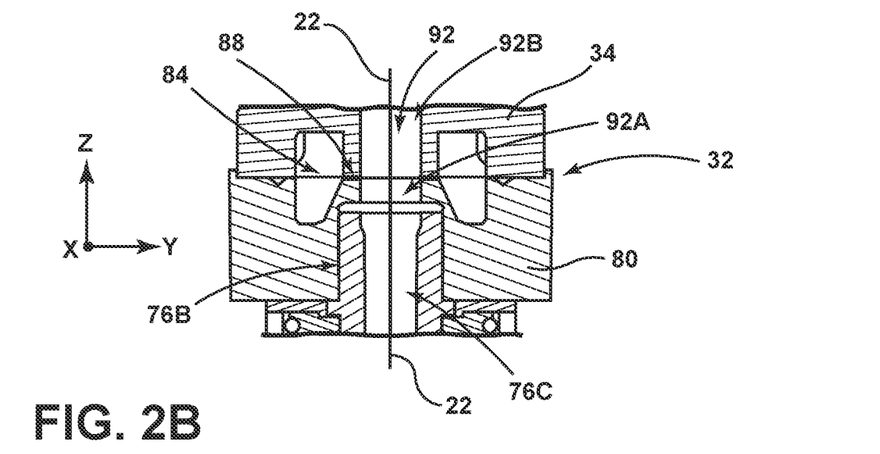
FIG. 2B is an enhanced view taken at section IIB of FIG. 2A, according to one embodiment.

According to various embodiments, the slow-cooling treatment device 26 is a device downstream from the draw furnace 14 in which the bare optical fiber 22 is cooled at a rate that is slower than the cooling rate of the fiber 22 in air at 25° C. and a pressure of 1 atm. A purge device 30 including a tube 32, as shown in FIG. 2, may be positioned above the treatment device 26 as shown and described herein. The treatment device 26 may be positioned proximate to the output or exit port of the furnace 14 so that the bare optical fiber 22 enters the treatment device 26 at a temperature between, for example, about 1,600° C. and 2,100° C. The bare optical fiber 22 exits the treatment device 26 at a temperature preferably greater than 500° C. The bare optical fiber 22 is preferably treated in the slow-cooling treatment device 26 for a time which is sufficient to result in a decrease in attenuation compared to a fiber of identical design which is not treated in the treatment device 26. For example, for optical fibers 22 having less than 0.5 wt percent germanium oxide in the core (and also for fibers 22 having cores which are free of germanium oxide), the fiber 22 is preferably treated (slow cooled) within the treatment device during the time period that the fiber temperature is between 1,200° C. and 1,800° C., more preferably while the fiber temperature is between 1,200° C. and 1,700° C., and even more preferably while the fiber temperature is between 1,300° C. and 1,600° C. For examples of the optical fibers 22 having greater than 0.5 wt percent germanium oxide in the core, the fiber 22 is preferably treated (slow cooled) within the treatment device during the time period that the fiber temperature is between 900° C. and 1,600° C., more preferably while the fiber temperature is between 1,000° C. and 1,500° C., and even more preferably while the fiber temperature is between 1,000° C. and 1,400° C. However, because the treatment device 26 utilizes lower than atmospheric pressures, these temperature ranges can be achieved in the treatment device 26 while simultaneously adding an amount of heat which is less than the amount which would otherwise be added if the treatment device was at or above atmospheric pressure. The average cooling rate of the fiber 22 in the treatment device 26 is defined as the fiber surface temperature at the entry point of the fiber 22 into the treatment device 26 (the fiber entry surface temperature) minus the fiber's surface temperature at an exit point of the fiber 22 out of the treatment device 26 (the fiber exit surface temperature) divided by the total residence time of the fiber 22 in the treatment device 26. The treatment device 26 may be configured to cool the bare optical fiber 22 as it passes from the furnace 14 to an exit port 38.

In addition, a gas inlet 42 is shown for providing an inert gas, shown as G1 in FIG. 1, as an input to the furnace 14. The gas G1 may include argon, according to one embodiment, to reduce the amount of ambient air reaching the furnace 14. According to another embodiment, the inert gas G1 may include nitrogen. It will be understood that more than one gas inlet 42 may be employed at various locations of the furnace 14 and treatment device 26.

In the embodiment shown in FIG. 1, the bare optical fiber 22 drawn from preform 18 passes out through the bottom of the furnace 14, through the treatment device 26 out the exit port 38, and, after sufficient cooling, into a coating unit 60. In the coating unit 60, a primary protective coating layer is applied to an outer surface of the bare optical fiber 22. After leaving the coating unit 60, the optical fiber 22, with a protective layer, can pass through a variety of processing stages within the production system 10 such as tractors or rollers 64 and onto fiber storage spool 38. One of the rollers 64 may be used to provide the necessary tension on the optical fiber 22 as it is drawn through the entire system and eventually wound onto a storage spool 38.

Referring now to FIG. 2A, positioned above the slow-cooling treatment device 26 is a nozzle assembly 76. The nozzle assembly 76 includes a nozzle body 76A and a nozzle tube 76B. A nozzle passageway 76C is defined by the nozzle assembly 76 through the nozzle body 76A and the nozzle tube 76B. Positioned above the slow-cooling treatment device 26 is the purge device 30. The purge device 30 includes the tube 32 and an upper member 96. The tube 32 includes an upper tube 34 and a lower tube 80. The lower tube 80 is positioned on the nozzle assembly 76 and extends around the nozzle tube 76B. Positioned on top of the lower tube 80 is the upper tube 34. The nozzle assembly 76 fluidly connects the slow-cooling treatment device 26 and the purge device 30. The upper tube 34 and the lower tube 80 cooperate to define an inlet manifold 84, inlet 88 and a tube passageway 92. The tube passageway 92, according to one embodiment, may be five times greater in length than its internal diameter. As shown in FIG. 2B, the inlet 88 fluidly couples the inlet manifold 84 with the tube passageway 92. The tube passageway 92 includes a first portion 92A defined by the lower tube 80 and a second portion 92B defined by the upper tube 34. Positioned above the upper tube 34 is the upper member 96. The upper member 96 defines both a straight portion 96A and a tapered portion 96B, with the tapered portion 96B being positioned above the straight portion 96A. A gap 100 is defined between the upper tube 34 and the straight portion 96A of the purge device 30. A member passageway 96C is defined by the upper member 96 through the straight portion 96A and the tapered portion 96B. Positioned above the upper member 96 is a fiber cutter 104. The fiber cutter 104 may be configured to cut the optical fiber 22 during an end of run sequence of the optical fiber production system 10 (e.g., when the preform 18 (FIG. 1) is spent). As is shown, the optical fiber 22 extends downwardly through the fiber cutter 104, the upper member 96, the upper tube 34, the lower tube 80, the nozzle assembly 76 and into the slow-cooling treatment device 26. Included within the tube passageway 92 or elsewhere may be a laser micrometer or other device configured to measure a diameter or other property (e.g. temperature, shape, location, etc.) of the optical fiber 22.

According to various embodiments, the nozzle assembly 76 may be sized and configured to decrease the flow of a treatment gas present inside of the slow-cooling treatment device 26 into the tube passageway 92. In operation, the heated treatment gas may tend to float upwards towards the upper tube 34 in such a manner that the slow-cooling treatment device 26 acts like a chimney. As such, the nozzle passageway 76C of the nozzle assembly 76 may be sized to a smaller diameter than that of the slow-cooling treatment device 26 such that a reduction in the amount of treatment gas escaping into the upper tube 34 may be achieved.

As explained above, the upper member 96 includes both the straight portion 96A and the tapered portion 96B. The straight portion and the tapered portion 96A, 96B are defined by straight and tapered exterior surfaces of the upper member 96. The member passageway 96C, which extends through both the straight portion 96A and the tapered portion 96B, may likewise be straight and tapered in the corresponding straight and tapered portions 96A, 96B. In other words, the straight and tapered portions 96A, 96B may be internally straight and tapered, respectively. According to various embodiments, an internal diameter of the straight portion 96A of the upper member 96 may be smaller than the internal diameter of the tube passageway 92. The internal diameter of the straight portion 96A and the member passageway 96C may be between about 7 mm and about 12 mm. The tube passageway 29 may have an internal diameter of between about 6 mm and about 12 mm. The gap 100 may be used as a camera window or sight port for viewing the optical fiber 22 during production. Further, as explained in greater detail below, the gap 100 may be used to purge injected gas and furnace particles from the upper tube 34 and generally the optical fiber production system 10. In the depicted embodiment, the straight portion 96A of the upper member 96 is shorter than the tapered portion 96B. In other embodiments, the straight portion 96A may be longer than the tapered portion 96B. The relative lengths of the straight and tapered portions 96A, 96B may affect the direction and trajectory of the purged injected gas and particles.

Referring now to FIG. 2B, the lower tube 80 is positioned around the nozzle tube 76B. As explained above, the inlet manifold 84 is fluidly coupled with the tube passageway 92 through the inlet 88. The inlet manifold 84 extends around the tube passageway 92 in a toroidal fashion. The inlet manifold 84 is configured to receive purge gas which is to be passed into the tube passageway 92 through the inlet 88 and against the optical fiber 22. The inlet manifold 84 may create a laminar flow of the purge gas. The toroidal shape of the inlet manifold 84 allows for the substantially uniform distribution of the purge gas to the inlet 88. The inlet 88, as depicted, is defined by an interface between the lower tube 80 and the upper tube 34. As such, the inlet 88 extends fully around a circumference of the tube passageway 92. It will be understood that the inlet 88 may be a continuous, or discontinuous, structure. For example, the inlet 88 may include a plurality of holes, slots or a combination thereof around the circumference of the tube passageway 92. The inlet 88 may have a height, of between about 0.1 mm to about 10.0 mm, or between about 0.25 mm to about 3.0 mm, or between about 0.5 mm to about 2.5 mm. According to various embodiments, the inlet 88 may be angled with respect to an X-Y horizontal plane of the optical fiber production system 10. For example, the angle of the inlet 88 may be between about 0° and about 40°, about 10° to about 35°, with respect to an X-Y plane of the optical fiber production system 10. In a specific example, the angle of the inlet 88 may be about 20°. In some embodiments, the inlet 88 is angled upwardly. By angling the inlet 88 upward, the injection of the purge gas toward and against the optical fiber 22 is in a direction generally opposite the drawing direction (the fiber draw direction downward in a Z-direction) of the optical fiber 22. It will be understood that the angle of the inlet 88 may vary with location around the circumference of the tube passageway 92. The inlet 88 may inject the purge gas at a volume flow rate of between about 0.1 standard liters per minute (SLPM) and about 80 SLPM, or between about 10 SLPM and about 40 SLPM. It will be understood that the height of the inlet 88 and the volume flow rate of purge gas supplied to the inlet 88 may be altered to achieve a desired static gas pressure on the optical fiber 22. The static pressure is generated by the purge gas impinging on the optical fiber 22. According to various embodiments, injection of the purge gas from the inlet 88 contacts the fiber 22 and strips a boundary layer of gases proximate the fiber 22. As explained in greater detail above and below, the boundary layer of gases proximate the optical fiber 22 may contain particulates from the furnace 14. The purge gas injected from the inlet 88 strips the boundary layer and particulates from the fiber 22 and ejects the boundary layer gases and particulates through the gap 100 or to the ambient environment above the tapered portion 96B of the upper portion 96. Put another way, the purge device 30 is configured to inject a purge gas into the passageway 92 through the inlet 88 and against the optical fiber 22 such that the purge gas disrupts a boundary layer of gas present along the optical fiber 22. According to various embodiments, the injection of the purge gas disrupts the boundary layer of gas present along the optical fiber 22 sufficiently to result in a reduction of particles present in the boundary layer from flowing into the slow-cooling treatment device 26.

The nozzle passageway 76C is fluidly coupled with the tube passageway 92. The nozzle passageway 76C may be tapered proximate the tube passageway 92 such that the nozzle passageway 76C has a smaller internal diameter than the tube passageway 92. In angled embodiments of the inlet 88, injection of the gas in an upward, or Z-direction, through the tube passageway 92 may result in the generation of low pressure within the first portion 92A of the tube passageway 92. The low pressure, and a high temperature of the process gases of the slow-cooling treatment device 26, may result in a buoyant flow of process gases within the slow-cooling treatment device 26 (FIG. 2A) moving into the tube passageway 92. As such, embodiments of the nozzle passageway 76C having a smaller internal diameter than the tube passageway 92 may advantageously decrease a "chimney" effect, or the buoyant flow of the processed gases from the slow-cooling treatment device 26 into the tube passageway 92.

Referring now to FIGS. 2A and 2B, in operation, as the optical fiber 22 is drawn through the optical fiber production system 10, a portion of the atmosphere furnace gases of the furnace 14 follows along and outside of the optical fiber 22 as the boundary layer. As explained above, SiO particles generated in the furnace 14 may be present in the boundary layer. The movement of the optical fiber 22 downward from the furnace 14 and into the upper tube 34 may draw the boundary layer and the particles into the slow-cooling treatment device 26. Presence of the particles on the surface of the optical fiber 22 while in the slow-cooling treatment device 26 may result in the formation of stress concentrators and weak points on the fiber 22. Accordingly, as explained above, the inlet 88 is configured to inject the purge gas into the tube passageway 92 and onto the optical fiber 22. Injection of the purge gas through the inlet 88 may be of a sufficient volume and pressure such that the boundary layer, and any associated particles, following the optical fiber 22 are blown off of the optical fiber 22 and moved toward a top of the upper tube 34 and removed from the optical fiber production system 10. For example, the furnace atmosphere and its associated particles may be purged from the optical fiber production system 10 through the gap 100, out a top of the tapered portion 96B of the upper member 96, or combinations thereof.

As explained above, in various embodiments, the straight portion 96A of the upper member 96 may have a smaller internal diameter than an internal diameter of the upper tube 34. The smaller internal diameter of the straight portion 96A relative to the upper tube 34 may result in a majority of the furnace atmosphere, particles, and gas injected from the inlet 88 to be expelled through the gap 100. Further, by designing the internal diameter of the tube passageway 92 to be larger than the straight portion 96A of the upper member 96, ambient air and/or latent environment particles may be prevented from entering into the upper member 96 or the upper tube 34 through the gap 100. In other words, a possible point of Venturi effect may be eliminated such that there is a net out-flux of the purge gas through the gap 100. As such, ambient air and particles do not enter the optical fiber protection system 10 and cause potential possible fiber break locations. In addition, in embodiments where the inlet 88 is angled with respect to an X-Y plane of the optical fiber production system 10, the movement of purge gas upwards through the upper tube 34 may result in the buoyant flow of process gas from within the slow-cooling treatment device 26 into the upper tube 34. The purge gas injected through the inlet 88 and the buoyant flow drawn from the slow-cooling treatment device 26 may synergistically cooperate to strip the boundary layer and its particles upwards away from the slow-cooling treatment device 26 and through the upper tube 34 towards the gap 100. The synergistic action of the purge gas and buoyant flow may result in a significant reduction of the particles that flow into the slow-cooling treatment device 26.

Use of the presently disclosed optical fiber production system 10 may result in the attainment of a number of advantages. First, use of the inlet 88 allows for particles to be removed from the optical fiber production system 10 prior to their entrance into the slow-cooling treatment device 26. As explained above, removal of particles from the slow-cooling treatment device 26 may reduce the adherence of the particles to the optical fiber 22 thereby resulting in an increased yield of usable optical fiber 22 per process run. Second, use of the inlet 88, the upper member 96 and the upper tube 34 may allow for particle removal efficiency in excess of 90%. Third, the purge gas may prevent the entrance of contaminants (e.g., glass shards, particles, debris) from entering the slow-cooling treatment device 26. For example, during the production of the optical fiber 22, contaminants may enter the optical fiber production system 10. Use of the purge gas and the buoyant flow may prevent the entrance of these contaminants into the slow-cooling treatment device 26. Fourth, the use of a smaller internal diameter of the straight portion 96A of the upper member 96 may reduce the entrance of ambient air into the furnace 14. Reduction in the amount of ambient air entering the furnace 14 may reduce the production of SiO particles within the furnace 14 (i.e., due to less oxygen being present in the furnace 14).

EXAMPLES

Figure 3A:
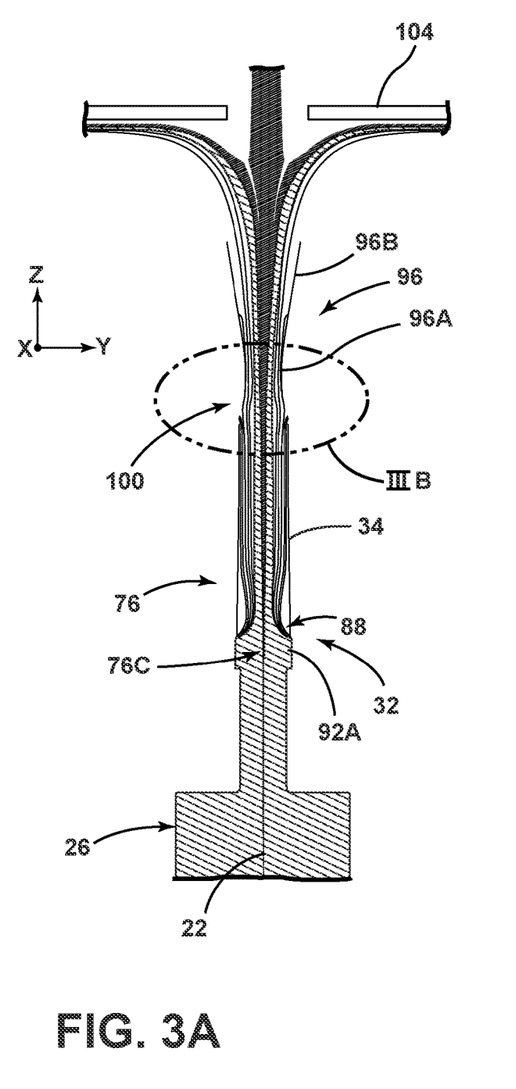
FIG. 3A is a computational fluid dynamics simulation of a schematic optical fiber production system.
Figure 3B:
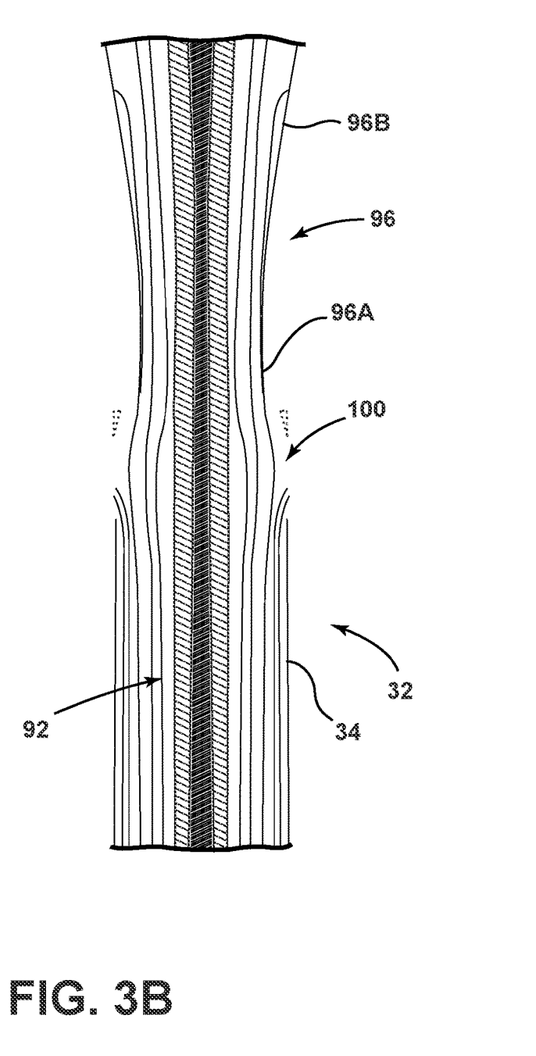
FIG. 3B is an enlarged view of section IIIB of FIG. 3A.

Referring now to FIGS. 3A and 3B, depicted is a computational fluid dynamics simulation of gas flow within the optical fiber production system 10 with a schematic representation of the upper member 96, the upper tube 34, the nozzle assembly 76, and the slow-cooling treatment device 26. In the depicted simulation, the purge gas injected through the inlet 88 has a volume flow rate of 40 SLPM and the inlet 88 has an angle with respect to an X-Y plane of the optical fiber production system 10 of about 20 degrees. As can be seen, the purge gas works in synergy with the buoyant flow gas of the slow-cooling treatment device 26 to counteract the boundary layer present proximate the optical fiber 22. As can be seen in the enhanced view in FIG. 3B, by designing the inner diameter of the straight portion 96A of the upper member 96 to have a smaller internal diameter than the first portion 92A of the upper tube 34, ambient air is prevented from entering the upper member 96 and the upper tube 34. Further, as explained above, the purge gas which exits the gap 100 may carry the particles with it, thereby removing the particles from the optical fiber production system 10.

Figure 3C:
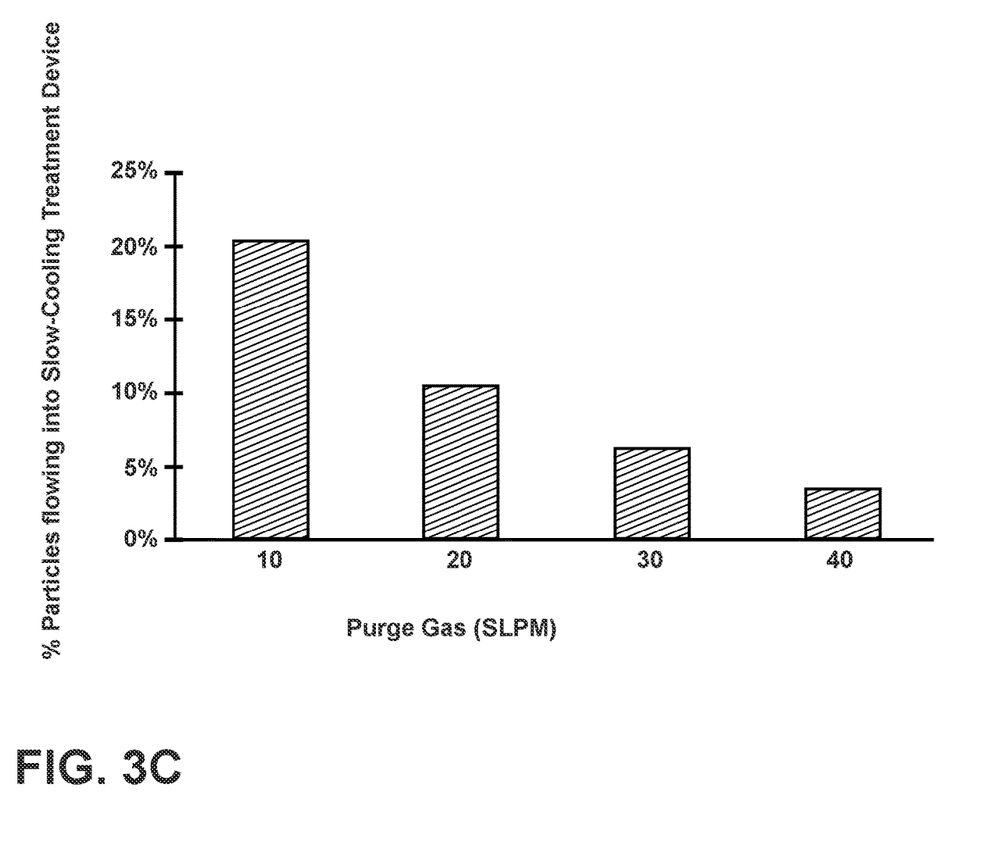
FIG. 3C is a graph depicting the percentage of particles flowing into the slow-cooling treatment device vs. the purge gas flow rate.

Referring now to FIG. 3C, as can be seen, an increase in the flow rate of the purge gas through the inlet 88 results in a decrease of particles flowing into the slow-cooling treatment device 26. For example, only those particles that are as close as about 0.1 mm to the optical fiber 22 flow into the slow-cooling treatment device 26. Particles that are further than about 0.1 mm from the fiber surface are deterred from entering the slow-cooling treatment device 26 and purged from the fiber production system 10.

Figure 4A:
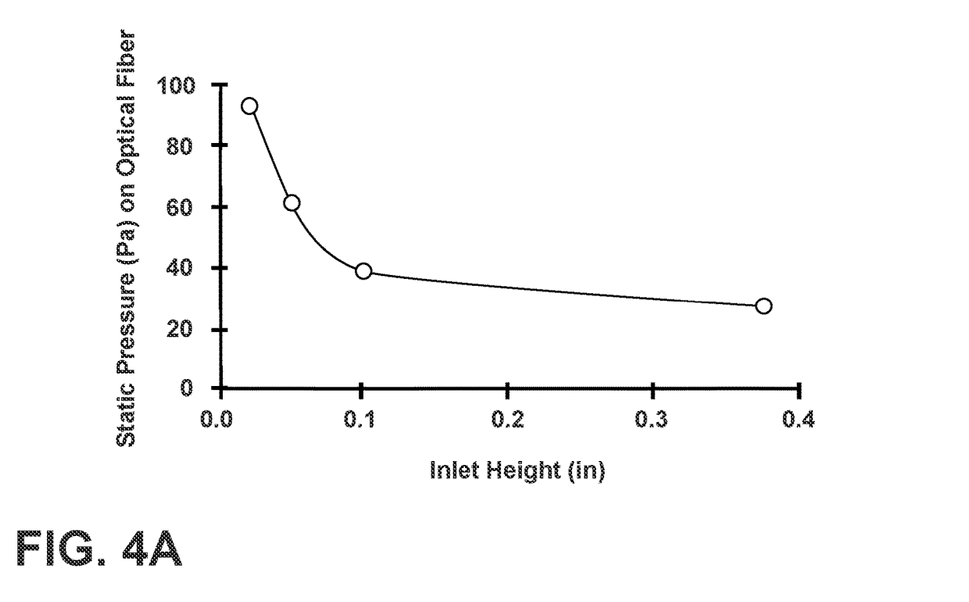
FIG. 4A is a graph depicting the static pressure on the optical fiber vs. the inlet height for a purge gas volume flow rate of 40 SLPM and 20° inlet angle.
Figure 4B:
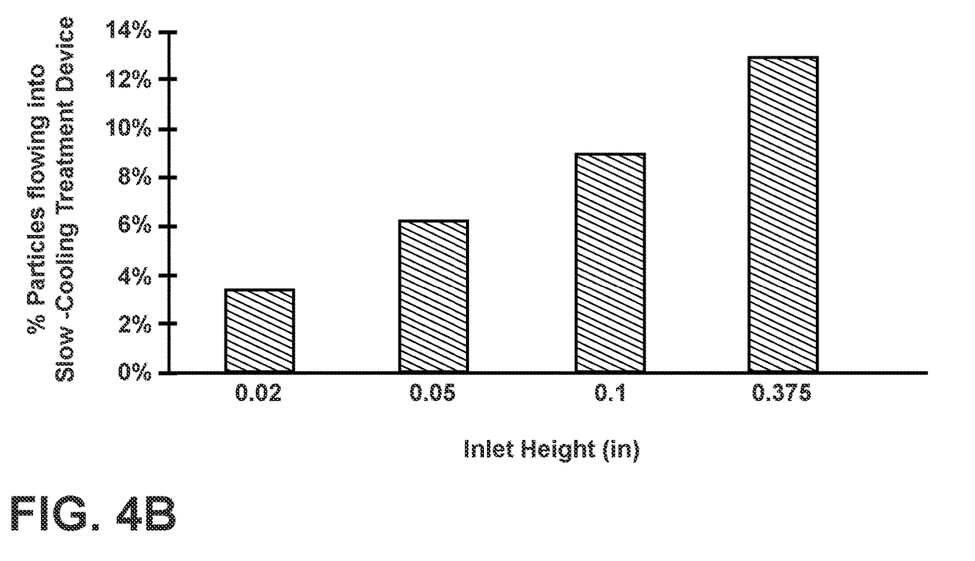
FIG. 4B is a graph depicting the percentage of particles flowing into the slow-cooling treatment device vs. the inlet height for a purge gas volume flow rate of 40 SLPM and 20° inlet angle.

Referring now to FIGS. 4A and 4B, the depicted simulations were based on a flow rate through the inlet 88 of about 40 SLPM at an angle of about 20° relative to an X-Y plane of the optical fiber production system 10. As can be seen, with an increasing inlet 88 size, the static pressure on the optical fiber 22 decreases and a percentage of particles entering the slow-cooling treatment device 26 increases. In other words, as the velocity of the purge gas decreases (i.e., due to the same volume of purge gas moving through a larger inlet 88) less particles are stripped from the boundary layer and are removed from the optical fiber production system 10 through the gap 100 and/or the upper member 96. As is apparent from FIGS. 4A and 4B, a reasonable compromise between static pressure and size of the inlet 88 is achieved by a 2.54 mm tall inlet 88 as the percentage of particles entering the slow-cooling treatment device 26 is much lower than in the absence of the device (e.g., about 9% vs. about 43%).

Figure 5A:
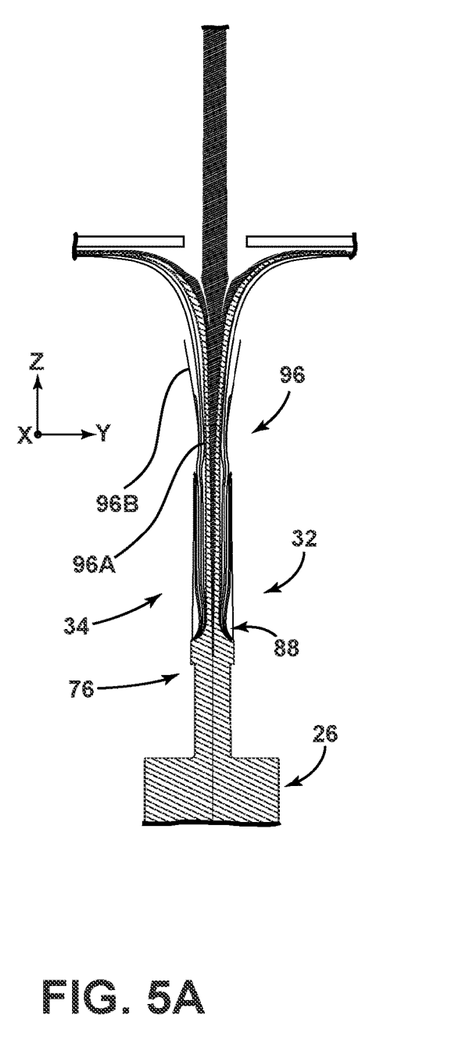
FIG. 5A is a computational fluid dynamics simulation of a schematic optical fiber production system.
Figure 5B:
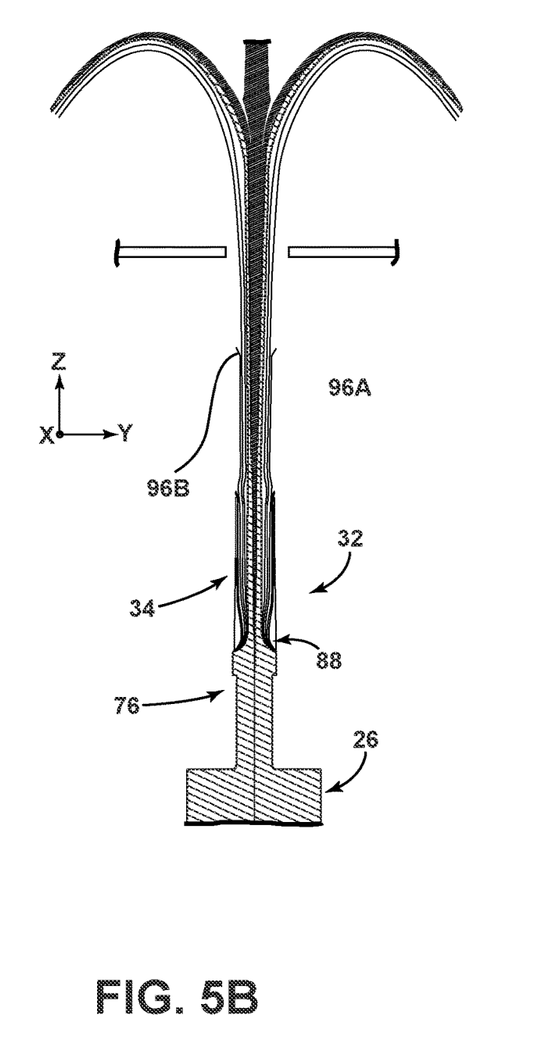
FIG. 5B is a computational fluid dynamics simulation of a schematic optical fiber production system.

Referring now to FIGS. 5A and 5B, the effect of the relationship between the length of the straight portion 96A and the tapered portion 96B of the upper member 96 is shown. As can be seen, in embodiments where the straight portion 96A is shorter than the tapered portion 96B (i.e., FIG. 5A) the purge gas, the stripped boundary layer and the buoyant flow of the slow-cooling treatment device 26 are more spread out along the fiber cutter 104 as opposed to embodiments where the straight portion 96A is of a longer length than the tapered portion 96B of the upper member 96 (FIG. 5B). In other words, the straight portion 96A channels the purge gas, boundary layer and buoyant flow. It can be seen that the purge gas works in synergy with the buoyant flow to strip the boundary layer. Furthermore, the simulation shows that a slight improvement to the performance of the purge gas can be realized if the straight portion 96A of the upper member 96 above the gap 100 is extended. The simulation shows that the boundary layer is stripped further away from the upper tube 34. This can be seen from a comparison of the pathlines in FIGS. 5A and 5B. Additionally, a slight reduction in the percentage of particles that flow into the slow-cooling treatment device 26 is also achieved by extending the straight portion 96A of the upper member 96 to 38 mm from about 9.5 mm.

Figure 6:
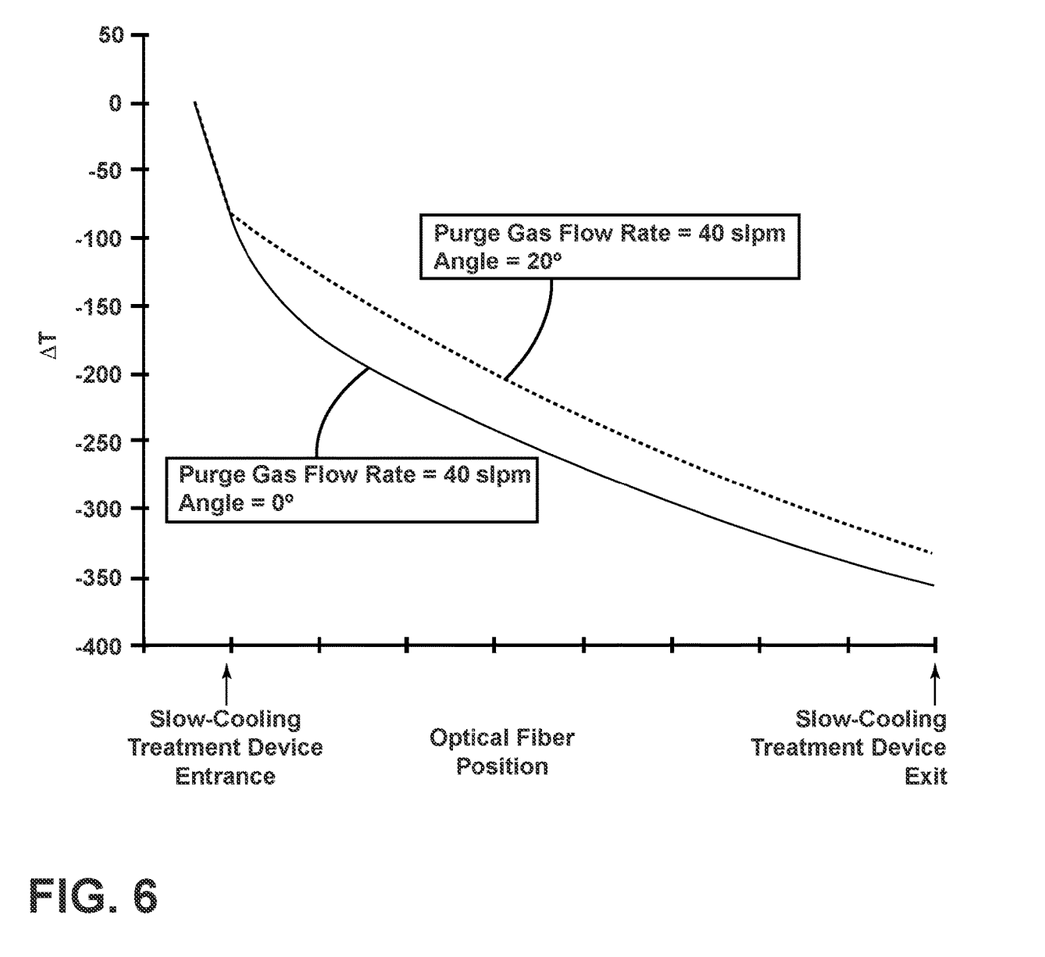
FIG. 6 is a graph illustrating the change in fiber temperature vs. the position of the optical fiber within the slow-cooling treatment device.

Referring now to FIG. 6, depicted is the change in temperature for the optical fiber 22 as it relates to an axial position of the fiber 22 within the slow-cooling treatment device 26. The temperature delta of the y-axis refers to the difference in temperature of the fiber 22 versus the temperature at which the optical fiber 22 leaves the furnace 14. As can be seen in the angled embodiment of the inlet 88, the fiber 22 cools in the slow-cooling treatment device 26 slower than the embodiment of the inlet 88 which is not angled. Embodiments of the inlet 88 which are not angled may result in the purge gas entering the slow-cooling treatment device 26 resulting in an increased cooling rate as opposed to the angled embodiment of the inlet 88. Such an embodiment may be disadvantageous in cooling the optical fiber 22 faster than a predetermined desirable rate.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below, are incorporated into and constitute part of this Detailed Description.

What is claimed is:

1. An optical fiber production system, comprising:
   a draw furnace;
   a slow-cooling device located downstream and separate from the draw furnace;
   a purge device positioned above the slow-cooling device and positioned below and spaced from the draw furnace, the purge device comprising a tube defining an inlet; and
   an optical fiber extending from the draw furnace through the slow-cooling device and the purge device, wherein the purge device is configured to inject a purge gas through the inlet and against the optical fiber in a direction generally opposite to a direction the optical fiber is drawn, wherein the slow-cooling device cools the optical fiber at a rate that is slower than a cooling rate of the optical fiber in air at 25° C. and a pressure of 1 ATM, and wherein the injection of the purge gas disrupts a boundary layer of gas present along the optical fiber sufficiently to result in a reduction of particles present in the boundary layer from flowing into the slow-cooling device.

2. The system of claim 1, wherein the purge gas has a flow rate through the inlet of between about 10 SLPM and about 40 SLPM.

3. The system of claim 1, wherein the inlet is continuous around a circumference of the tube.

4. The system of claim 1, wherein the inlet has an angle with respect to an X-Y plane of the optical fiber production system of greater than about 0° and less than about 40°.

5. The system of claim 4, wherein the inlet has an angle with respect to an X-Y plane of the optical fiber production system of greater than about 10° and less than about 35°.

6. The system of claim 1, wherein the inlet has a height of between about 0.1 mm and about 10.0 mm.

7. The system of claim 1, wherein the tube further defines an inlet manifold, the inlet fluidly coupling the inlet manifold and a passageway of the tube.

8. An optical fiber production system, comprising:
   a draw furnace;
   a slow-cooling device located downstream and separate from the draw furnace;
   a purge device positioned above the slow-cooling device and positioned below and spaced from the draw furnace, comprising:
      a tube defining a passageway through which an optical fiber is drawn and an inlet, the purge device configured to inject a purge gas into the passageway through the inlet and against the optical fiber in a direction generally opposite to a direction the optical fiber is drawn such that the purge gas disrupts a boundary layer of gas present along the optical fiber, wherein the slow-cooling device cools the optical fiber at a rate that is slower than a cooling rate of the optical fiber in air at 25° C. and a pressure of 1 ATM.

9. The system of claim 8, wherein the injection of the purge gas disrupts the boundary layer of gas present along the optical fiber sufficiently to result in a reduction of particles present in the boundary layer from flowing into the slow-cooling device.

10. The system of claim 9, wherein the inlet has a height of between about 0.1 mm and about 10.0 mm.

11. The system of claim 8, wherein the inlet has an angle with respect to an X-Y plane of the optical fiber production system of greater than about 0° and less than about 40°.

12. The system of claim 8, wherein the inlet is continuous around a circumference of the tube.

13. The system of claim 8, wherein a gap is defined between the tube and an upper member of the purge device.

14. A method of forming an optical fiber, comprising:
providing a tube and a nozzle assembly positioned over a slow-cooling treatment device and positioned below and spaced from a draw furnace, the tube defining an inlet;
heating an optical fiber preform in the draw furnace;
drawing an optical fiber from the preform;
passing the optical fiber through the tube and the nozzle assembly, wherein the slow-cooling treatment device is located downstream and separate from the draw furnace and the slow-cooling treatment device cools the optical fiber at a rate that is slower than a cooling rate of the optical fiber in air at 25° C. and a pressure of 1 ATM; and
injecting a purge gas through the inlet toward the optical fiber, wherein the injection of the purge gas toward the optical fiber is in a direction generally opposite a drawing direction of the optical fiber such that the purge gas disrupts a boundary layer of gas present along the optical fiber.

15. The method of claim 14, further comprising the step:
drawing the purge gas within the slow-cooling treatment device into the tube.

16. The method of claim 14, wherein the inlet has an angle with respect to an X-Y plane of the optical fiber production system of between about 0° and about 40°.

17. The method of claim 14, wherein the purge gas has a flow rate through the inlet of between about 10 SLPM and about 40 SLPM.

* * * * *